United States Patent

[11] 3,625,319

| [72] | Inventor | Walter J. Krause<br>South Bend, Ind. |
|---|---|---|
| [21] | Appl. No. | 851,287 |
| [22] | Filed | Aug. 19, 1969 |
| [45] | Patented | Dec. 7, 1971 |
| [73] | Assignee | The Bendix Corporation |

[54] DISC ELEMENT CONSTRUCTION FOR DISC BRAKE
6 Claims, 4 Drawing Figs.

[52] U.S. Cl. .................................................. 188/218 XL, 192/107 R
[51] Int. Cl. ..................................................... F16d 65/12
[50] Field of Search ............................................. 188/218 XL, 73.2; 192/107 R

[56] References Cited
UNITED STATES PATENTS

| 3,456,768 | 7/1969 | Holcomb, Jr. ................. | 188/218 XL |
| 2,303,201 | 11/1942 | Eason .......................... | 192/107 X |
| 3,237,731 | 3/1966 | Du Bois ........................ | 188/218 Axial |

Primary Examiner—George E. A. Halvosa
Attorneys—William N. Antonis and Plante, Arens, Hartz, Hix & Smith ABSTRACT: The following relates to a friction disc element construction for a disc brake which includes a pair of laminations formed of a plurality of interconnected annularly arranged segments wherein the interconnection includes a plurality of circumferential link members. All of the segments of both laminations are symmetrically alike, but the segments of one lamination are allochirally arranged with respect to the segments of the other lamination. Each segment includes an integral protruberance extending therefrom which overlaps and contacts the next adjacent segment along the radially outer edge thereof.

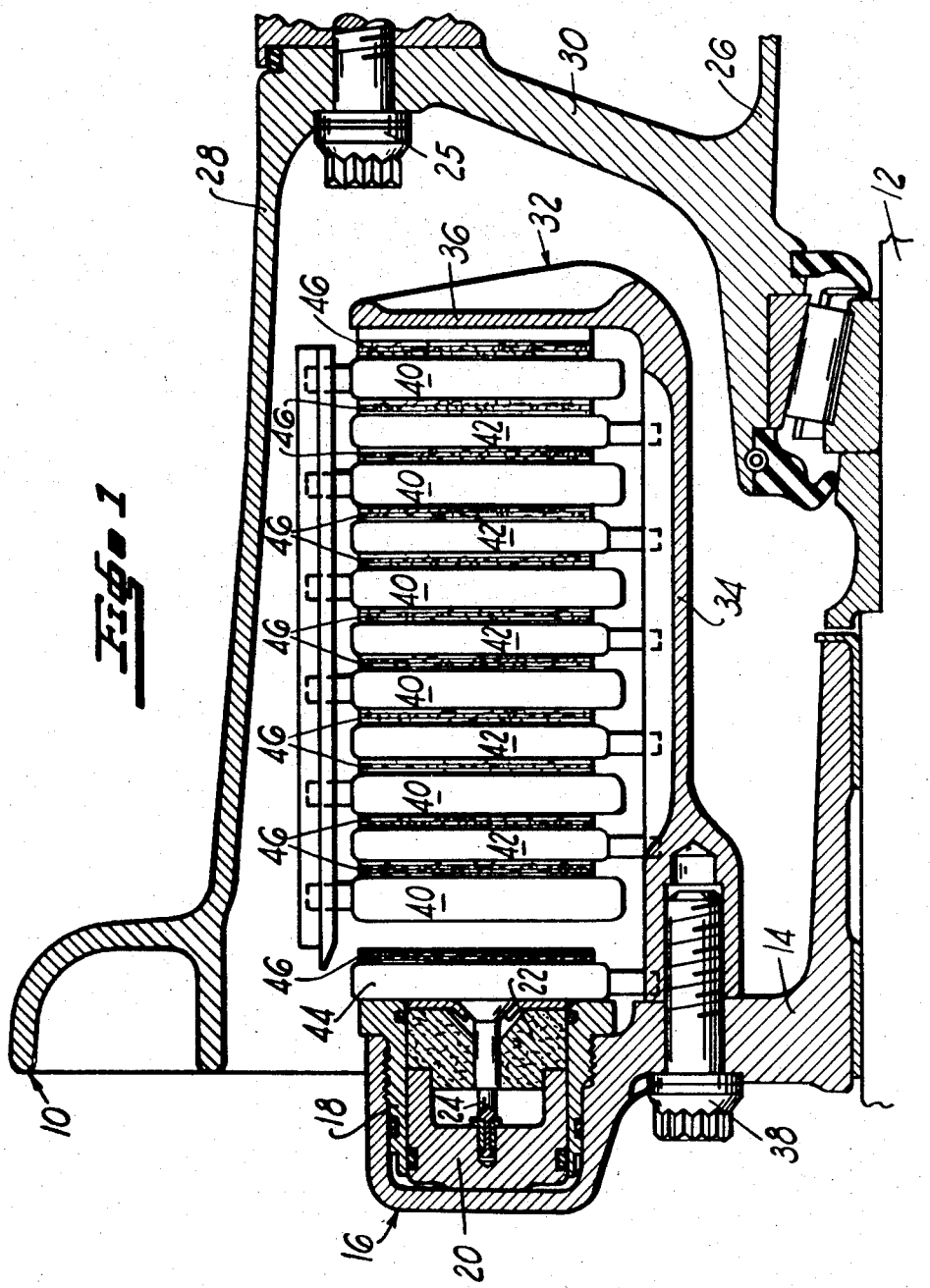

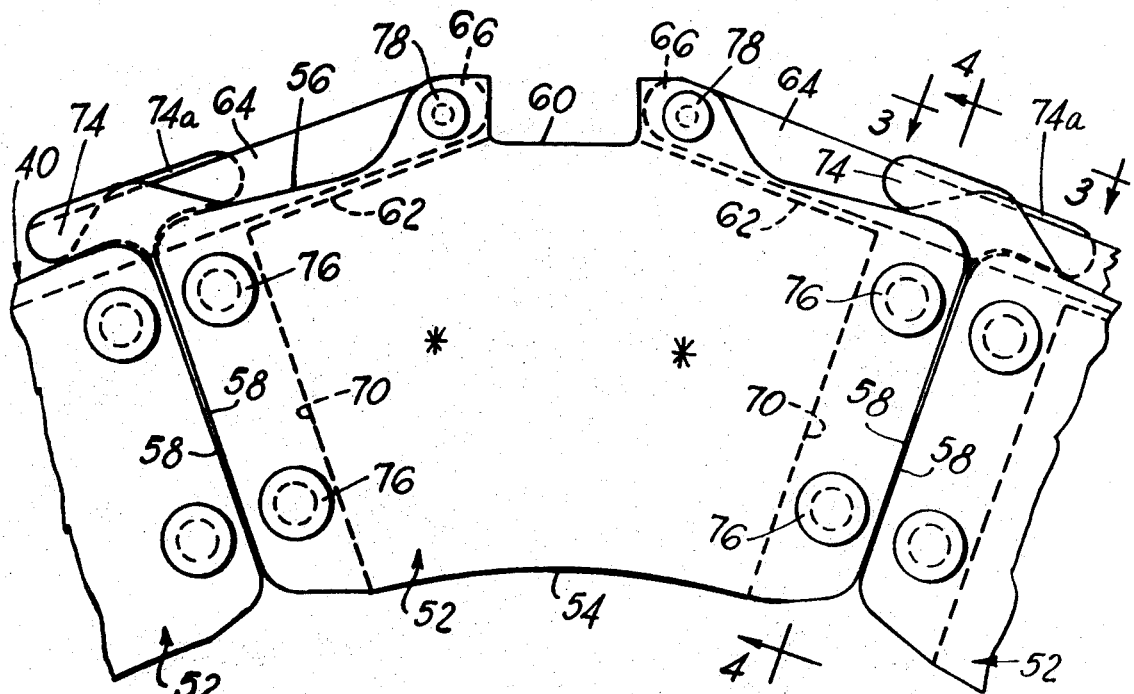
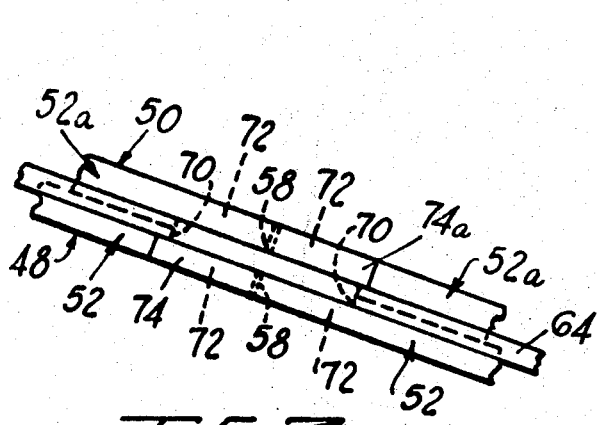
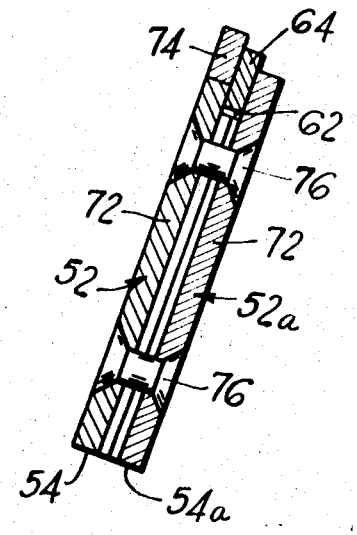

3,625,319

DISC ELEMENT CONSTRUCTION FOR DISC BRAKE

BACKGROUND OF THE INVENTION

Disc brakes which utilize segmented annular disc elements arranged to permit individual thermal expansion of the disc segments without interference between adjacent segments are shown and described in various prior art patents such as U.S. Pat. Nos. 2,423,881; 2,531,696; 2,683,504; 2,893,519 and 3,237,731. All disc brake elements to a greater or lesser degree, including those shown in the foregoing patents, tend to warp and wear upon extensive encounters with thermal shock. Such warp and wear obviously will have a direct bearing on the effectiveness and life of any brake. In other words, higher degrees of warp and wear will reduce brake effectiveness and brake life whereas lesser degrees of warp and wear will increase break effectiveness and brake life. Accordingly, any disc element construction which would eliminate or substantially reduce such warp and wear would constitute a significant advance in the art and particularly so if such construction is less expensive than disc elements which are presently in use.

SUMMARY OF THE INVENTION

Accordingly, in view of the foregoing, it is an object of this invention to provide a unique friction disc element of the segmented-type which will increase brake effectiveness and extended brake life.

Another object of this invention is to provide a segmented disc element which absorbs heat in a more uniform manner and withstands thermal shock better than existing disc elements.

A further object of this invention is to provide a segmented disc element which is less expensive to fabricate than existing disc elements.

A still further object of this invention is to provide a segmented disc element, of the type shown in my U.S. Pat. application Ser. No. 716,902 filed Mar. 28, 1968, now U.S. Pat. No. 3,473,635, wherein each segment is formed so that the oppositely disposed faces of each segment are capable of flexing toward each other at the leading and trailing ends thereof.

Another object of this invention is to provide a disc element formed of a pair of segmented laminations wherein all of the segments of both laminations are symmetrically alike, but the segments of one of said laminations are allochirally arranged with respect to the segments of the other of said laminations.

An important object of this invention is to provide a disc element comprising first and second laminations formed with a plurality of annularly arranged segments wherein each segment includes an integral protruding sheer member extending therefrom for overlapping and contacting the next adjacent segment along the radially outer edge thereof. Such an arrangement eliminates the necessity of a separate shear member between the segments, such as a pin, cruciform, etc.

The advantages of this unique segmented disc element construction over existing commercial constructions are decidedly significant. MOre particularly, the hereinafter described segmented disc element is self-compensating when encountering thermal shock thereby permitting higher brake effectiveness and extended brake life. While existing brake components tend to warp and wear upon extensive encounters with thermal shock, the instant construction has decreased warpage and wear under severe service conditions. Because of the foregoing higher brake effectiveness, it is also possible to utilize simpler brake constructions and reduce service life maintenance since fewer rotating parts are required to perform at a given level.

Other objects, features and advantages of the invention will be apparent from the following description of the invention taken in connection with the accompanying drawings.

BRIEF DESCRIPTION OF THE DRAWINGS

FIG. 1 is a sectional view of a portion of a symmetrical wheel and brake assembly which incorporates the invention;

FIG. 2 is a side elevation of a portion of a symmetrical rotor removed from the brake assembly of FIG. 1;

FIG. 3 is a view taken substantially along line 3—3 of FIG. 2; and

FIG. 4 is a sectional view taken substantially along line 4—4 of FIG. 2.

DESCRIPTION OF THE PREFERRED EMBODIMENT

Referring to FIG. 1, it will be seen that the wheel brake assembly, which is illustrated, includes a wheel 10 rotatably mounted on a stationary axle 12 and a stationary carrier member 14 which is connected to the axle through any suitable means such as by a direct bolt connection (not shown). The construction for rotatably mounting the wheel 10 to axle 12 and fixing the stationary carrier member 14 to the axle 12 is well known and a detailed description thereof is not deemed to be necessary. The carrier contains a plurality of fluid motors 16 each of which includes a protective sleeve 18 threadedly secured to the carrier and a piston 20 located and slidable in the sleeve. A block of insulating material 22 is secured to the head end of the piston by a threaded pin 24 for protecting the hydraulic brake fluid from the heat generated during braking. The wheel 10, which is formed of two sections fastened together by a plurality of bolts 25, includes a hub portion 26 and a rim portion 28 interconnected by a plurality of spokes 30. A torque tube 32, which includes a sleeve 34 and an annular backing plate flange 36, is fixedly secured to the carrier member 14 by a plurality of circumferentially spaced bolts 38.

The brake which is illustrated is of the disc-type and includes a plurality of interleaved rotors 40, which are splined to and are rotated by the aircraft wheel 10, and include stators 42, which are splined to sleeve 34 of the torque tube 32. The specific novel construction of the rotors will be described hereafter. Both of the rotors and stators are movable axially and are sometimes referred to as a brake "stack." It is the frictional engagement of these relatively rotatable rotors and stators which produces the desired braking action on the aircraft wheel. A pressure plate 44, which is suitably attached to the fluid motor 16, forces the rotors 40 and stators 42 against each other upon actuation of the motors by thrusting at one side of the stack and biasing the entire stack against the backing plate 36. Pressure plate 44, each of the stators 42, and the backing plate have friction material lining 46 provided thereon.

Referring to Figures 2-4 which show the novel detail construction of each of the rotors 40, it will be seen that each rotor is comprised of two laminations 48 and 50. One of the laminations 48 is formed of a plurality of annularly arranged segments 52 and the other of the laminations 50 is formed of a plurality of annularly arranged segments 52a. Both of the segments 52 and 52a are symmetrically alike, but it will be noted that the segments 52 of lamination 48 are allichorally arranged with respect to the segments 52a of the lamination 50. That is, segments 52 and 52a are symmetrically alike, but with parts reversed in position and arrangement, as to right and left, as one hand.

Thus, it will be seen from the drawings that each segment 52 has a radially inner edge 54, a radially outer edge 56, and two angularly disposed ends 58 extending between the edges. A key-slot notch 60 is located at the radially outer edge 56 and intermediate the ends 58 of each of the segments. Each of these notches slidably engage axially extending keys located on the inner periphery of the aircraft wheel 10. It will be understood that, if desired, the key slot arrangement could be reversed so that the slot is formed in the wheel and the key is formed on the outer edge of each of the segments 52 and 52a.

Circumferentially extending grooves 62 are located in the radially outer edge 56 of each pair of adjacent segments and extend from both ends 58 of the segments to the key-slot notch 60. A plurality of tension link members 64 are located in the circumferentially extending grooves 62 and are utilized to interconnect the segments to form an annular disc. More specifically, each link member has the ends 66 thereof connected to annularly adjacent segments substantially at the location of the key-slot notch 60. By connecting the ends of the link member as close to the key-slot notches as possible, that is, as close as possible to an intermediate position of the segments, the effects of shrinkage are minimized. The foregoing link members 64 resist the effects of centrifugal force when rotor is rotated about its rotational axis, thereby restraining each segment from moving radially outwardly.

In order to reduce the wear rate of the disc element segments and thus increase the life thereof, each of the laminated segments and is formed with radially extending grooves 70 which are located in the leading and trailing ends 58 of the segments. These grooves 70 provide opposed cantileverlike flat projections 72 which are capable of flexing towards each other. This resulting flexibility of the leading and trailing edges of each segment prevents the segment from in effect "plowing" through the surface of the adjacent disc element and thus increases the life of the disc elements by reducing lining wear and the wear on the segments.

In order to take the shear loads between adjacent segments which arise during braking, each of the segments 52 if formed with an integral fingerlike projection protuberance 74 which extends therefrom so that it overlaps and contacts the next adjacent segment along the radially outer edge 56 thereof. Each of the segments 52a likewise has a similar projection 74a which is utilized for the same purpose. This unique arrangement eliminates the necessity of having a separate shear member between the segments. A pair of rivets 76 located near each end of the segments and a pair of rivets 78 located adjacent to the drive key-slot 60 hold the laminations together. The rivets at each end of the segments also prevent the leading and trailing edges from separating due to warp producing stresses created by heat input to only one surface of each lamination, said edges still being free to deflect toward the centerline of the segments as previously noted.

The several practical advantages which flow from this invention are believed to be obvious from the foregoing description and other advantages may suggest themselves to those who are familiar with the art to which this invention relates.

Furthermore, although this invention has been described in connection with a specific embodiment, it will be obvious to those skilled in the art that various changes may be made in the form, structure and arrangement of parts without departing from the spirit of the invention. For example, although the drawings disclose the invention in connection with a rotor, it will be understood that the invention could be utilized in connection with a segmented stator. In addition the key-slot-engaging means need not necessarily be located on the radially outer edge of the segment, but could also be located on the radially inner edge if desired.

In other words, depending on the wheel and brake arrangement the rotors could be driven from the outer or inner diameter thereof, as required, and the stators could, likewise, be keyed to a torque member at the outer or inner diameter thereof, as required.

Having thus described the various features of the invention what I claim as new and desire to secure by Letters Patent is:

1. In a wheel and brake assembly having axially extending key-slot-type engaging means, a friction disc element comprising a plurality of annularly arranged symmetrically alike segments each having a radially inner edge, a radially outer edge, and two angularly disposed ends extending between said edges, mating key-slot-type engaging means operatively connected to said disc for slidable engagement with said first mentioned key-slot-type engaging means, link means having opposite end portions fixedly secured to adjacent segments for interconnecting said segments to form an annular disc wherein all of said segments are restrained against radial outward movement and integral shear taking means extending from each of said segments for overlapping and contacting the next adjacent segment along the radially outer edge thereof.

2. The structure, as defined in claim 1, wherein said shear-taking means comprises a fingerlike projection extending from each of said segments for overlapping and contacting the next adjacent segment along the radially outer edge thereof.

3. The structure, as defined in claim 2, wherein said friction disc element comprises first and second laminations each of which is formed of a plurality of said annularly arranged symmetrically alike segments.

4. The structure, as defined in claim 3, wherein said segments of said first lamination are allochirally arranged with respect to said segments of said second lamination.

5. The structure, as defined in claim 4, wherein said fingerlike projections of one of said laminations extend in a clockwise direction and said fingerlike projections of the other of said laminations extend in a counterclockwise direction.

6. The structure, as defined in claim 5, wherein each fingerlike projection of said first lamination is in juxtaposition with one of the fingerlike projections of said second lamination.

* * * * *